No. 841,704. PATENTED JAN. 22, 1907.
R. C. E. MOORE.
CORN HARVESTING MACHINE.
APPLICATION FILED JAN. 31, 1906.
2 SHEETS—SHEET 1.
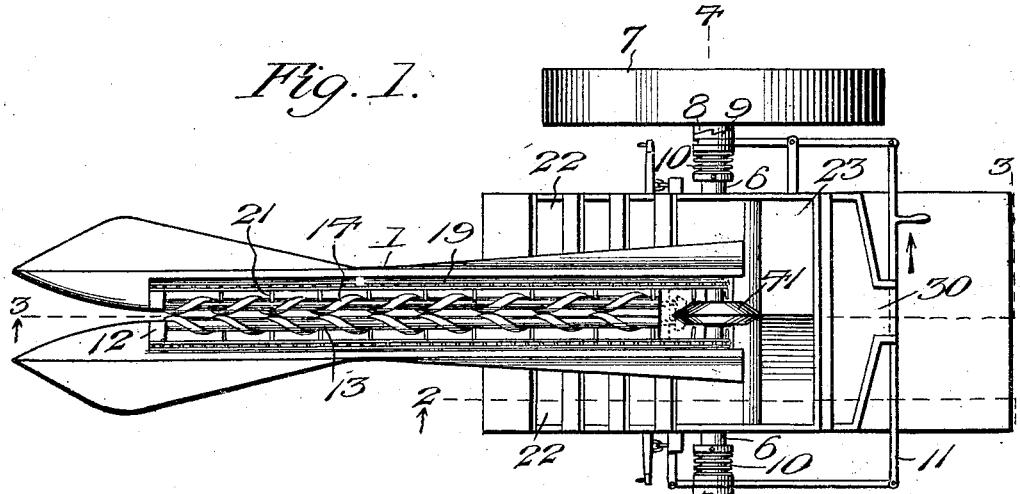
Fig. 1.
Fig. 5.
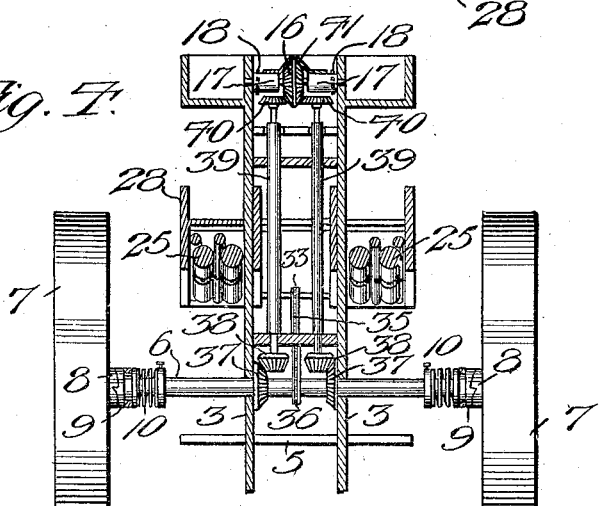
Fig. 7.
WITNESSES:
INVENTOR
R. C. E. Moore,
By Victor J. Evans
Attorney No. 841,704. PATENTED JAN. 22, 1907.
R. C. E. MOORE.
CORN HARVESTING MACHINE.
APPLICATION FILED JAN. 31, 1906.
2 SHEETS—SHEET 2.
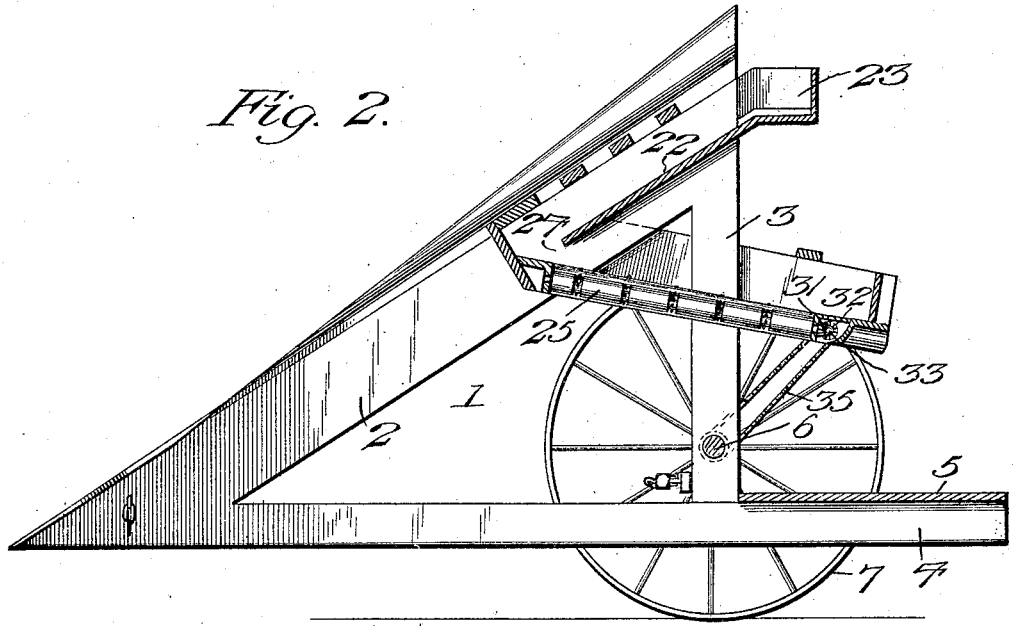
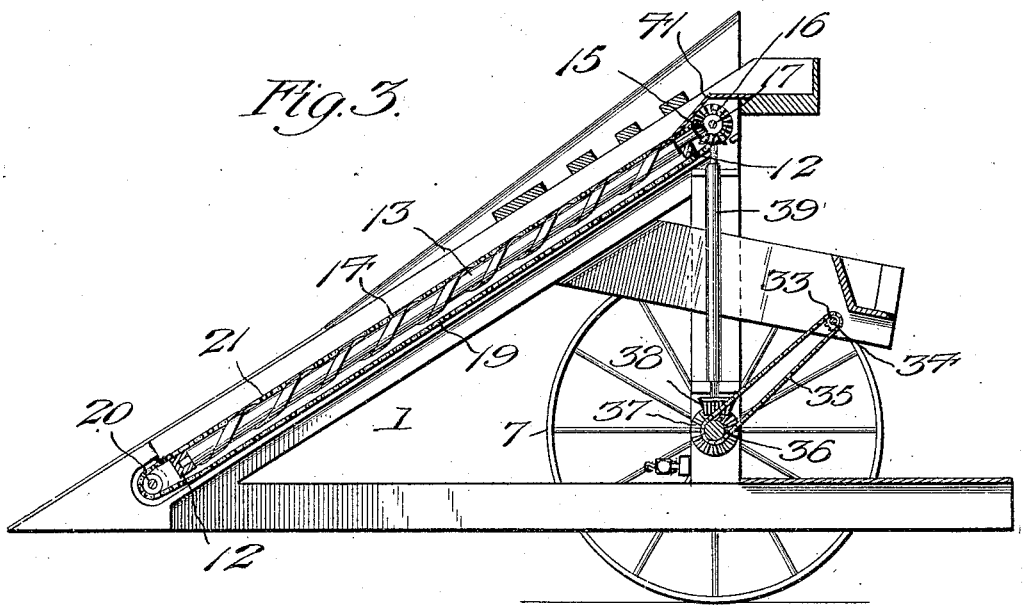
WITNESSES:
INVENTOR
R. C. E. Moore,
By Victor J. Evans
Attorney

UNITED STATES PATENT OFFICE.

ROBERT C. E. MOORE, OF BOONVILLE, INDIANA.

CORN-HARVESTING MACHINE.

No. 841,704.  Specification of Letters Patent.  Patented Jan. 22, 1907.

Application filed January 31, 1906. Serial No. 298,832.

*To all whom it may concern:*

Be it known that I, ROBERT C. E. MOORE, a citizen of the United States, residing at Boonville, in the county of Warrick and State of Indiana, have invented new and useful Improvements in Corn-Harvesting Machines, of which the following is a specification.

This invention relates to corn-harvesting machines, and embodies in its organization a pair of coöperating harvesting and stripping-rollers and a plurality of sets of husking-rollers, and has for its objects to provide a comparatively simple inexpensive device of this character which in practice will during its travel over the field effectually strip the ears of corn from the stalks and deliver them to the husking-rollers, one wherein the corn will be properly distributed to the sets of husking-rollers, and one wherein the husked corn will be delivered at the rear of the machine into a suitable receptacle.

A further object of the invention is to provide a device of this character wherein the harvesting and husking rollers will be positively driven from the main shaft, one in which the rollers may be thrown out of operation at will, and one in which the corn will be positively fed upward on the harvesting-rollers and by gravity on the husking-rollers.

With these and other objects in view the invention comprises the novel features of construction and combination of parts more fully hereinafter described.

In the accompanying drawings, Figure 1 is a top plan view of a corn-harvesting machine embodying the invention. Fig. 2 is a side elevation of the same, partly in section, the section being taken on the line 2 2 of Fig. 1. Fig. 3 is a vertical longitudinal section taken centrally through the machine on the line 3 3 of Fig. 1. Fig. 4 is a vertical transverse section taken on the line 4 4 of Fig. 1. Fig. 5 is a detail plan view of a portion of one pair of the husking-rollers and their driving-shaft.

Referring to the drawings, 1 designates the main frame of the machine, including a pair of substantially triangular members or plates 2, disposed in a vertical plane and in relatively spaced relation, said plates having at their rear ends upright pieces or bars 3 and being provided with horizontal rearward extensions 4, adapted to sustain a platform or table 5, there being journaled in the uprights 3 an axle 6, constituting the main drive-shaft and having in turn journaled thereon transporting-wheels 7, provided with toothed clutch members 8, adapted to be normally engaged by spring-pressed clutch members 9, fixed for rotation with the shaft and adapted for movement longitudinally thereof, against the action of springs 10, through the medium of a set of operating-levers 11.

Arranged between the upper inclined portions of the frame members 2 and terminally journaled in suitable bearings 12 is a pair of coöperating forwardly and downwardly inclined harvesting and snapping rollers 13 in the form of spiral conveyer-shafts having continuous spiral flights 14 and provided at their rear ends with bevel-pinions 15 in mesh with a duplex bevel-gear 16, fixed upon a stub-shaft 17, suitably journaled in the frame and having sprockets 18, adapted for driving a pair of chain conveyers 19, arranged respectively at opposite sides of the pair of spiral conveyers and mounted for travel at the foreward end of the frame upon rollers 20, there being carried by the endless chains 19 inwardly-projecting fingers 21 for a purpose which will hereinafter appear.

Attached to the frame members 2 at their rear ends is a pair of downwardly and forwardly inclined chutes 22, disposed, respectively, at opposite sides of the machine and having communication at their rear ends with a common hopper 23, the bottom of which inclines from its center downward toward the upper ends of the chutes, which are provided at their lower ends with discharge-openings 24, adapted to deliver onto underlying husking-rollers 25, arranged in pairs at opposite sides of the machine, said husking-rollers, which are provided with peripheral grooves or recesses 26, having therein husk-engaging spurs or teeth 27, being arranged at a downward and rearward inclination and journaled in suitable bearings in husking-frames 28, mounted upon the frame 1 at opposite sides of the machine and communicating at their rear ends with a common discharge-hopper 29, having a discharge-mouth 30, from which may be suspended a bag or other receptacle for the husked corn.

The husking-rollers are provided at their rear ends with bevel-pinions 31 in mesh with corresponding pinions 32 on an operating-shaft 33, suitably journaled in the frames 28 and provided at its longitudinal center with a sprocket-wheel 34, adapted to receive a sprocket-chain 35, driven from a sprocket-wheel 36 on the main drive-shaft 6, there being also fixed on said drive-shaft a pair of beveled gears 37 in mesh, respectively, with pinions 38, fixed upon the lower ends of vertical operating-shafts 39, journaled in suitable bearings in the frame between the uprights 3 and having at their upper ends bevel-pinions 40 in mesh with the duplex gear 16, over which there is disposed a guard or shield 41.

In practice as the machine advances over the ground the stalks pass between the spiral conveyer-rollers 13, which are driven from the main shaft 6 through the medium of the operating-shafts 39, as will be readily understood, and the ears of corn are stripped from the stalks and carried upward by said rollers under the action of the spiral blades or flights 14. Upon reaching the upper end of the conveyer-rollers the ears of corn are delivered into the hopper 23 and pass down the inclined bottom of the latter to the chutes 22, from which it is delivered onto the pairs of husking-rollers 25, it being noted in this connection that the corn will be equally distributed to the husking-rollers from the hopper. In the operation of the rollers 13 the upward feeding of the corn will be materially aided by the inwardly-projecting fingers 21 on the conveyer-chains 19, which are positively driven by the shaft 17, in turn operated from the drive-shaft through the medium of the connecting-shafts 39. The corn when discharged from the chutes through the openings 24 falls onto the forward upper ends of the husking-rollers, down which it is fed by gravity, and is husked or shucked under the action of the teeth 27, it being apparent that the corn passes from the husking-rollers, which are positively driven from the main shaft 6, through the medium of the chain 35 and operating-shaft 33 into the discharge-hopper 29 and thence through the discharge-mouth 30 into the receptacle. In the operation of the machine the harvesting and conveying and husking devices may be thrown out of action at any time and at the will of the attendant through the medium of the set of clutch-levers 11, which when moved to the right, as indicated by the arrow in Fig. 1, carry the clutch members 9 out of engagement with the clutches 8, thus stopping the operation of drive-shaft 6.

Having thus fully described my invention, what I claim is—

In a corn-harvesting machine, a main frame, a pair of forwardly and downwardly inclined coöperating harvesting and conveying rollers mounted in the frame, a hopper arranged for receiving material from said rollers, two sets of downwardly and rearwardly inclined husking-rollers sustained in the frame respectively at opposite sides of the hopper and having their forward ends disposed at a point in advance of and remote from the rear ends of the harvesting-rollers, a pair of downwardly and forwardly inclined chutes leading from the hopper respectively to the sets of husking-rollers, said hopper having its bottom inclined from its center downward toward the chutes and the latter being arranged to deliver material at the forward upper ends of the sets of husking-rollers, a main drive-shaft, transporting-wheels connected for operating the same, and operative connections between said shaft and the conveying and husking rollers.

In testimony whereof I affix my signature in presence of two witnesses.

ROBERT C. E. MOORE.

Witnesses:
    JOHN L. FLETCHER,
    K. ALLEN.